(12) United States Patent
Kobayashi et al.

(10) Patent No.: US 10,232,288 B2
(45) Date of Patent: Mar. 19, 2019

(54) DEFOAMER OIL COMPOUND, PRODUCTION METHOD THEREFOR, AND DEFOAMER COMPOSITION

(71) Applicant: SHIN-ETSU CHEMICAL CO., LTD., Tokyo (JP)

(72) Inventors: Akihiro Kobayashi, Annaka (JP); Chinami Matsui, Annaka (JP); Takato Sakurai, Annaka (JP); Shunji Aoki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 72 days.

(21) Appl. No.: 15/328,641

(22) PCT Filed: Jul. 24, 2015

(86) PCT No.: PCT/JP2015/071126
§ 371 (c)(1),
(2) Date: Jan. 24, 2017

(87) PCT Pub. No.: WO2016/021427
PCT Pub. Date: Feb. 11, 2016

(65) Prior Publication Data
US 2017/0209813 A1 Jul. 27, 2017

(30) Foreign Application Priority Data

Aug. 5, 2014 (JP) ................... 2014-159242
Sep. 3, 2014 (JP) ................... 2014-179077

(51) Int. Cl.
| C08L 83/06 | (2006.01) |
| B01D 19/04 | (2006.01) |
| C08K 3/36 | (2006.01) |
| C08L 83/04 | (2006.01) |
| C08G 77/18 | (2006.01) |

(52) U.S. Cl.
CPC ......... B01D 19/0409 (2013.01); B01D 19/04 (2013.01); B01D 19/0431 (2013.01); C08G 77/18 (2013.01); C08K 3/36 (2013.01); C08L 83/04 (2013.01); C08L 83/06 (2013.01); C08L 2205/025 (2013.01)

(58) Field of Classification Search
None
See application file for complete search history.

(56) References Cited

U.S. PATENT DOCUMENTS

| 3,865,544 A | 2/1975 | Keil | |
| 3,984,200 A | 10/1976 | Doesburg | |
| 3,984,347 A | 10/1976 | Keil | |
| 4,639,489 A * | 1/1987 | Aizawa | B01D 19/0409 516/123 |
| 5,543,082 A * | 8/1996 | McGee | B01D 19/0409 516/118 |
| 5,977,191 A | 11/1999 | Fey et al. | |
| 6,001,887 A * | 12/1999 | Keup | B01D 19/0409 516/118 |
| 6,517,958 B1 * | 2/2003 | Sellinger | H01L 51/0039 252/301.35 |
| 6,605,183 B1 * | 8/2003 | Rautschek | B01D 19/0404 162/164.4 |
| 7,566,750 B2 * | 7/2009 | Rautschek | B01D 19/04 524/588 |
| 2003/0013808 A1 * | 1/2003 | Tonge | B01D 19/0409 525/100 |

(Continued)

FOREIGN PATENT DOCUMENTS

| EP | 2 325 262 B1 | 8/2012 |
| GB | 1 204 383 A | 9/1970 |
| GB | 1 468 896 A | 3/1977 |
| JP | 51-71886 A | 6/1976 |

(Continued)

OTHER PUBLICATIONS

Extended European Search Report dated Apr. 20, 2018, in European Patent Application No. 15830505.2.
International Search Report for PCT/JP2015/071126 (PCT/ISA/210) dated Oct. 20, 2015.
Written Opinion of the International Searching Authority for PCT/JP2015/071126 (PCT/ISA/237) dated Oct. 20, 2015.

Primary Examiner — Robert S Loewe
(74) Attorney, Agent, or Firm — Birch, Stewart, Kolasch & Birch, LLP

(57) ABSTRACT

The present invention relates to a defoamer oil compound that contains an organopolysiloxane (A), a fine silica powder (B), and a group (C) that is represented by the organopolysiloxanes of formulas (I) and/or (II)

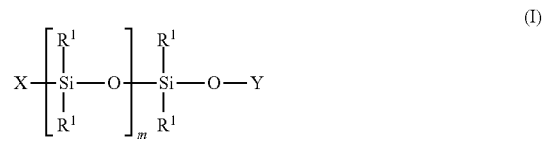

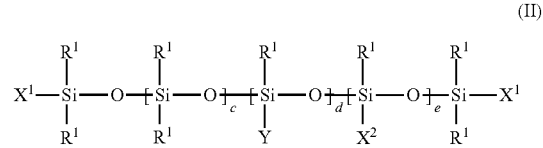

(in the formulas, c, d, and e are each an integer of 0 or more, and at least one of $X^1$ to $X^3$ is the group represented by formula (i)). The component (C) is used as a surface treatment agent for the component (B). The present invention makes it possible to obtain a silicone-based defoamer composition that imparts good initial defoaming properties even in an alkaline foaming liquid, that exhibits very little loss in performance over time, and that has excellent defoaming performance.

8 Claims, No Drawings

(56) References Cited

U.S. PATENT DOCUMENTS

| | | | |
|---|---|---|---|
| 2006/0020082 A1* | 1/2006 | Rautschek | B01D 19/0409 524/863 |
| 2006/0160908 A1 | 7/2006 | Rautschek et al. | |
| 2008/0021152 A1* | 1/2008 | Rautschek | B01D 19/0404 524/588 |
| 2009/0137446 A1* | 5/2009 | Rautschek | B01D 19/0404 510/347 |
| 2009/0234029 A1 | 9/2009 | Takewaki et al. | |
| 2012/0256624 A1 | 10/2012 | Takewaki et al. | |
| 2015/0119509 A1* | 4/2015 | Brehm | B01D 19/0409 524/147 |

FOREIGN PATENT DOCUMENTS

| | | |
|---|---|---|
| JP | 51-35556 B2 | 10/1976 |
| JP | 52-19836 B2 | 5/1977 |
| JP | 52-22638 B2 | 6/1977 |
| JP | 52-31836 B1 | 8/1977 |
| JP | 54-43015 B2 | 12/1979 |
| JP | 55-23084 B2 | 6/1980 |
| JP | 10-52601 A | 2/1998 |
| JP | 2006-37104 A | 2/2006 |
| JP | 2006-199962 A | 8/2006 |
| JP | 2007-222812 A | 9/2007 |
| JP | 4232031 B2 | 3/2009 |
| JP | 2011-104525 A | 6/2011 |
| JP | 2013-215633 A | 10/2013 |

* cited by examiner

DEFOAMER OIL COMPOUND, PRODUCTION METHOD THEREFOR, AND DEFOAMER COMPOSITION

TECHNICAL FIELD

This invention relates to an oil compound for a defoamer which includes a specific organopolysiloxane as a silica surface treatment agent. More particularly, the invention relates to an oil compound for a defoamer that has an excellent initial defoaming ability and defoaming persistence even in foaming liquids, especially alkaline foaming liquids. The invention additionally relates to a method of production thereof, and to a defoamer composition containing the same.

BACKGROUND ART

Silicone-based defoamers are widely used in processes accompanied by foaming in such areas as the chemical, food, petroleum, papermaking, textile and pharmaceutical industries. Oil compound-type defoamers obtained by mixing a silicone oil such as dimethylpolysiloxane, methylphenylpolysiloxane or methylvinylpolysiloxane with a fine silica powder have been commonly used.

Emulsion-type defoamers obtained by dispersing such an oil compound-type defoamer together with a surfactant in water at the time of actual use, and self-emulsifying defoamers that use both a polyoxyalkylene group-modified organopolysiloxane and an oil compound have also been disclosed (Patent Document 1: JP-A S51-71886; Patent Document 2: JP-B S54-43015; Patent Document 3: JP-B S52-19836; Patent Document 4: JP-B S52-22638; Patent Document 5: JP-B S55-23084). However, their defoaming performances are largely attributable to the oil compound-type defoamer serving as a starting material; in the prior art, the defoaming performance has fallen short. For example, problems that arise include an insufficient initial defoaming performance and a decrease over time in the defoaming performance upon prolonged contact with a foaming liquid. These drawbacks are particularly acute when the foaming liquid is alkaline.

Various solutions have been proposed in order to ameliorate these problems and further improve the defoaming performance. One example is a method in which the silica to be used in the oil compound is rendered hydrophobic beforehand with chlorosilane or the like (Patent Document 6: JP-B S52-31836). Another example is a method in which silica is treated with a nitrogen-containing organosilicon compound (Patent Document 7: JP-B S51-35556). Unfortunately, these solutions are inadequate in terms of performance, with decreases in the defoaming performance occurring over time. Hence, an even further improvement in performance is desired.

Solutions that have been proposed to address these problems include self-emulsifying defoamer compositions (Patent Document 8: JP No. 4232031) and emulsion-type defoamer compositions (Patent Document 9: JP-A 2007-222812) in which the alkali resistance has been increased by mixing and treating, in the presence of an alkaline catalyst, a hydrophobic organopolysiloxane and a fine silica powder surface-treated with an organopolysiloxane. However, these approaches also have drawbacks, including changes over time in the viscosity of the oil compound due to insufficient neutralization in the neutralization step of oil compound production, and the fact that removing the organic acid, inorganic acid or the like used as the neutralizing agent is not easy.

Recently, to address these problems, a method for producing an oil compound that undergoes little change in viscosity over time and from which residual neutralizing agent is easily removed has been disclosed (Patent Document 10: JP-A 2011-104525). This method entails mixing and treating, in the presence of an alkaline catalyst, a mixture of a hydrophobic organopolysiloxane with a fine silica powder, and then carrying out a neutralization reaction using a solid acid such as succinic acid.

PRIOR ART DOCUMENTS

Patent Documents

Patent Document 1: JP-A S51-71886
Patent Document 2: JP-B S54-43015
Patent Document 3: JP-B S52-19836
Patent Document 4: JP-B S52-22638
Patent Document 5: JP-B S55-23084
Patent Document 6: JP-B S52-31836
Patent Document 7: JP-B S51-35556
Patent Document 8: JP No. 4232031
Patent Document 9: JP-A 2007-222812
Patent Document 10: JP-A 2011-104525

SUMMARY OF THE INVENTION

Problems to be Solved by the Invention

In light of the above, an object of this invention is to provide an oil compound which, even in foaming liquids, especially alkaline foaming liquids, has a good initial defoaming ability that moreover does not deteriorate over time and thus manifests an excellent defoaming performance. Further objects of the invention are to provide a method for producing such an oil compound, and a defoamer composition containing such an oil compound.

Means for Solving the Problems

The inventors have conducted extensive investigations in order to achieve the above objects. As a result, they have discovered that by using an oil compound for defoamers that includes
(A) an inherently hydrophobic organopolysiloxane having a viscosity at 25° C. of from 10 to 100,000 mm$^2$/s,
(B) a fine silica powder having a specific surface area of at least 50 m$^2$/g, and
(C) an organopolysiloxane of general formula (I) and/or (II) below,
wherein component (C) is used as a surface treatment agent for component (B), it is possible to obtain a silicone-based defoamer composition having an excellent initial defoaming ability even in alkaline foaming liquids and, in particular, an excellent defoaming persistence.

Accordingly, the invention provides the following oil compound for a defoamer, a method for the production thereof, and a defoamer composition that includes the same.
[1] An oil compound for a defoamer, comprising:
(A) 100 parts by weight of an inherently hydrophobic organopolysiloxane having a viscosity at 25° C. of from 10 to 100,000 mm$^2$/s,
(B) from 1 to 30 parts by weight of a fine silica powder having a specific surface area of at least 50 m$^2$/g, and (C) from 0.001 to 5 parts by weight of an organopolysiloxane of general formula (I) and/or (II) below

[Chemical Formula 1]

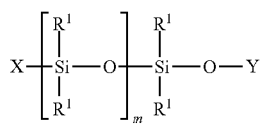
(I)

(wherein X is an organic group selected from $R^1$ and Y—O—; Y is an organic group represented by —$SiR^1_{3-a}$ $(OR^2)_a$; $R^1$ is a monovalent organic group of 1 to 20 carbon atoms; each $R^2$, which may be the same or different, is a hydrogen atom or a substituted or unsubstituted, saturated or unsaturated monovalent hydrogen carbon group of 1 to 20 carbon atoms; a is an integer from 1 to 3; and m is an integer of 2 or more)

[Chemical Formula 2]

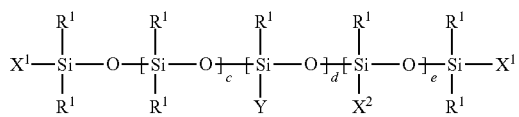
(II)

[wherein each $R^1$ is independently a monovalent organic group of 1 to 20 carbon atoms, $X^1$ and $X^2$ are each independently $R^1$ or a group of formula (i) below

[Chemical Formula 3]

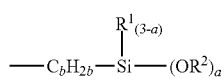
(i)

(wherein $R^1$ is as defined above; each $R^2$, which may be the same or different, is a hydrogen atom or an unsubstituted or substituted, saturated or unsaturated monovalent hydrocarbon group of 1 to 20 carbon atoms; a is an integer from 1 to 3; and b is an integer of 2 or more), each Y is independently a group of formula (ii) below

[Chemical Formula 4]

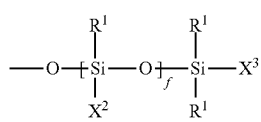
(ii)

(wherein $R^1$ and $X^2$ are as defined above, $X^3$ is the same as $X^1$, and f is an integer of 0 or more), and c, d and e are each integers of 0 or more, with the proviso that at least one of $X^1$ to $X^3$ is a group of formula (i)],
wherein component (C) serves as a surface treatment agent for component (B).
[2] A method for producing an oil compound for a defoamer, the method comprising:

(1) a first step of kneading together
(A) 100 parts by weight of an inherently hydrophobic organopolysiloxane having a viscosity at 25° C. of from 10 to 100,000 mm²/s,
(B) from 1 to 30 parts by weight of a fine silica powder having a specific surface area of at least 50 m²/g,
(C) from 0.001 to 5 parts by weight of an organopolysiloxane of general formula (I) and/or (II) below

[Chemical Formula 5]

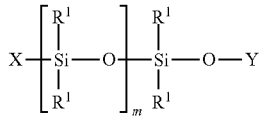
(I)

(wherein X is an organic group selected from $R^1$ and Y—O—; Y is an organic group represented by —$SiR^1_{3-a}$ $(OR^2)_a$; $R^1$ is a monovalent organic group of 1 to 20 carbon atoms; each $R^2$, which may be the same or different, is a hydrogen atom or a substituted or unsubstituted, saturated or unsaturated monovalent hydrogen carbon group of 1 to 20 carbon atoms; a is an integer from 1 to 3; and m is an integer of 2 or more)

[Chemical Formula 6]

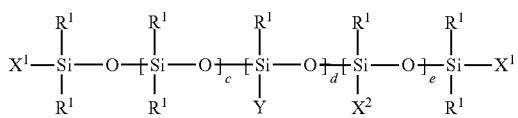
(II)

[wherein each $R^1$ is independently a monovalent organic group of 1 to 20 carbon atoms, $X^1$ and $X^2$ are each independently $R^1$ or a group of formula (i) below

[Chemical Formula 7]

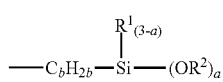
(i)

(wherein $R^1$ is as defined above; each $R^2$, which may be the same or different, is a hydrogen atom or an unsubstituted or substituted, saturated or unsaturated monovalent hydrocarbon group of 1 to 20 carbon atoms; a is an integer from 1 to 3; and b is an integer of 2 or more), each Y is independently a group of formula (ii) below

[Chemical Formula 8]

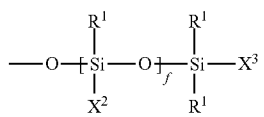
(ii)

(wherein $R^1$ and $X^2$ are as defined above, $X^3$ is the same as $X^1$, and f is an integer of 0 or more), and c, d and e are each integers of 0 or more, with the proviso that at least one of $X^1$ to $X^3$ is a group of formula (i)], and (D) from 0 to 5 parts by weight of water;
(2) a second step of heat-treating the kneaded mixture obtained in the first step, the first and second steps together constituting a first compounding;
(3) a third step of kneading (E) from 0.001 to 5 parts by weight of an alkaline catalyst or an acid catalyst into the kneaded mixture obtained in the second step;
(4) a fourth step of heat-treating the kneaded mixture obtained in the third step, the third and fourth steps together constituting a second compounding; and
(5) a fifth step of kneading an acid or an alkali as a neutralizing agent into the kneaded mixture obtained in the fourth step.

[3] A defoamer composition comprising the oil compound of [1] above.

The defoamer composition can be prepared in a solution form, a self-emulsifying form or an emulsion form, and is suitable for use in alkaline foaming liquids.

Advantageous Effects of the Invention

This invention makes it possible to obtain silicone-based defoamer compositions which impart a good initial defoaming ability even in alkaline foaming liquids and, in particular, exhibit very little loss in performance over time, thus having an excellent defoaming performance.

EMBODIMENT FOR CARRYING OUT THE INVENTION

The invention is described more fully below.

The inventive oil compound for a defoamer includes (A) an inherently hydrophobic organopolysiloxane having a viscosity at 25° C. of from 10 to 100,000 mm$^2$/s, (B) a fine silica powder having a specific surface area of at least 50 m$^2$/g, and (C) an organopolysiloxane of general formula (I) and/or (II), and is characterized in that component (C) serves as a surface treatment agent for component (B).

Component (A)

The organopolysiloxane serving as component (A) is inherently hydrophobic. Here, "inherently hydrophobic" signifies that, even when it includes hydrophilic groups as some of the functional groups, the overall organopolysiloxane exhibits hydrophobicity.

The inherently hydrophobic organopolysiloxane (A) may be linear or branched, although one having average compositional formula (II) below is especially preferred.

$$R^3{}_g SiO_{(4-g)/2} \quad (II)$$

In formula (II), each $R^3$ is an unsubstituted or substituted monovalent hydrocarbon group of 1 to 18, and especially 1 to 15, carbon atoms, which groups may be the same or different. Illustrative examples of the monovalent hydrocarbon group represented by $R^3$ include alkyl groups such as methyl, ethyl, propyl, isopropyl, butyl, isobutyl, pentyl, hexyl, heptyl, octyl nonyl, decyl, dodecyl, tridecyl, tetradecyl, hexadecyl and octadecyl groups; cycloalkyl groups such as a cyclohexyl group; alkenyl groups such as vinyl and allyl groups; aryl groups such as phenyl and tolyl groups; aralkyl groups such as styryl and α-methylstyryl groups; and any of these groups in which some or all of the hydrogen atoms bonded to carbon atoms are substituted with halogen atoms, cyano groups, amino group or hydroxyl groups, such as chloromethyl, 3-chloropropyl, 3,3,3-trifluoropropyl, cyanoethyl, 3-aminopropyl and N-(β-aminoethyl)-γ-aminopropyl groups. From the standpoint of defoaming ability and cost-effectiveness, it is preferable for at least 80 mol %, and in particular at least 90 mol %, of all the $R^3$ groups to be methyl groups.

Also, g is a positive number such that $1.9 \leq g \leq 2.2$, and preferably $1.95 \leq g \leq 2.15$.

The organopolysiloxane may be end-capped with a triorganosilyl group of the formula $R^3{}_3Si-$ or with a diorganohydroxysilyl group of the formula $(HO)R^3{}_2Si-$.

This inherently hydrophobic organopolysiloxane (A) has a viscosity at 25° C., as measured with an Ostwald viscometer, which from the standpoint of defoaming ability and workability, is from 10 to 100,000 mm$^2$/s, and preferably from 50 to 30,000 mm$^2$/s. At less than 10 mm$^2$/s, the defoaming performance worsens, and at more than 100,000 mm$^2$/s, the viscosity of the oil compound for a defoamer (sometimes referred to below as a "silicone oil compound") increases, resulting in a poor workability.

With regard to component (A) of the invention, typically a cyclic low-molecular-weight siloxane such as octamethylcyclotetrasiloxane is produced by ring-opening polymerization using a catalyst. However, because the product following polymerization contains some of the cyclic low-molecular-weight siloxane used as the starting material, it is preferable to use a product obtained by driving off this starting material under applied heat and reduced pressure while passing an inert gas through the reactor during the reaction.

Illustrative, non-limiting, examples of the specific structure of component (A) of the invention are shown below. In the following formulas, Me, Vi, Ph and OH stand for, respectively: methyl, vinyl, phenyl and hydroxyl groups.

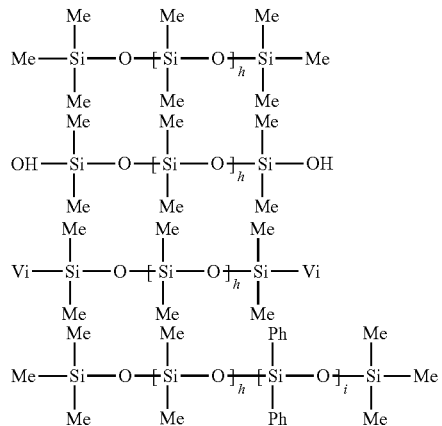

In these formulas, $h \geq 10$ and $i \geq 1$.

Component (B)

The fine silica powder serving as component (B) is preferably a hydrophilic silica such as fumed silica or precipitated silica. These may be used singly, or two or more may be used together. The fine silica powder has a specific surface area (BET method) of at least 50 m$^2$/g, preferably from 100 to 700 m$^2$/g, and even more preferably from 150 to 500 m$^2$/g. At a specific surface area of less than 50 m$^2$/g, a good defoaming performance is not obtained.

Commercially available component (B) that can be used in this invention is exemplified by AEROSIL® 300 (a hydrophilic fumed silica having a BET specific surface area of 300 m$^2$/g) and AEROSIL® 200 (a hydrophilic fumed silica having a BET specific surface area of 200 m$^2$/g), both of which can be purchased from Nippon Aerosil Co., Ltd., and NIPSIL® L-250 (a hydrophilic precipitated silica having a BET specific surface area of 170 m²/g) which can be purchased from Tosoh Silica Corporation.

The proportion of component (B) is from 1 to 30 parts by weight, and preferably from 5 to 15 parts by weight, per 100 parts by weight of component (A). At less than 1 part by weight, a satisfactory defoaming performance is not obtained. At more than 30 parts by weight, the viscosity of the resulting silicone oil compound rises and the workability is poor.

Component (C)

The terminal alkoxy-modified organopolysiloxane of general formula (I) below that serves as component (C) is an ingredient which, along with carrying out surface hydrophobizing treatment on component (B), enhances the component (B) wettability by and dispersibility in component (A). The organopolysiloxane may be of a single type used alone, or may be of two or more types used together.

[Chemical Formula 10]

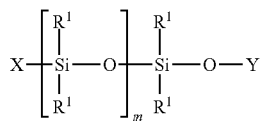

Wherein, X is an organic group selected from $R^1$ and Y—O—; Y is an organic group represented by —$SiR^1_{3-a}(OR^2)_a$; $R^1$ is a monovalent organic group of 1 to 20 carbon atoms; each $R^2$, which may be the same or different, is a hydrogen atom or a substituted or unsubstituted, saturated or unsaturated monovalent hydrocarbon group of 1 to 20 carbon atoms; a is an integer from 1 to 3; and m is an integer of 2 or more.

In formula (I), $R^1$ is a monovalent organic group of 1 to 20 carbon atoms, each of which groups may be the same or different. $R^1$ is a monovalent hydrocarbon group having 1 to 20, especially 1 to 15, carbon atoms, preferred examples of which include alkyl groups such as methyl, ethyl, propyl, isopropyl, butyl, isobutyl, pentyl, hexyl, heptyl, octyl, nonyl, decyl, dodecyl, tridecyl, tetradecyl, hexadecyl and octadecyl groups, cycloalkyl groups such as a cyclohexyl group, alkenyl groups such as vinyl and allyl groups, aryl groups such as phenyl and tolyl groups, and aralkyl groups such as styryl and α-methylstyryl groups. An alkyl group or aryl group is more preferred, and an alkyl group or phenyl group of 1 to 10 carbon atoms is even more preferred.

$R^2$ is a hydrogen atom or an unsubstituted or substituted, saturated or unsaturated monovalent hydrocarbon group of 1 to 20, especially 1 to 15, carbon atoms, each of which groups may be the same or different. Illustrative examples of the monovalent hydrocarbon group of $R^2$ include alkyl groups such as methyl, ethyl, propyl, isopropyl, butyl, isobutyl, pentyl, hexyl, heptyl, octyl, nonyl, decyl, dodecyl, tridecyl, tetradecyl, hexadecyl and octadecyl groups, cycloalkyl groups such as a cyclohexyl group, alkenyl groups such as vinyl and allyl groups, aryl groups such as phenyl and tolyl groups, aralkyl groups such as styryl and α-methylstyryl groups, and any of these groups in which some or all of the hydrogen atoms bonded to carbon atoms are substituted with halogen atoms, cyano groups or the like, such as chloromethyl, 3-chloropropyl, 3,3,3-trifluoropropyl and cyanoethyl groups. $R^2$ is preferably an alkyl group.

The subscript "a" is an integer from 1 to 3, preferably 2 or 3, and more preferably 3. The subscript "m" is preferably from 2 to 100, more preferably from 2 to 80, and even more preferably from 2 to 50.

General formula (I) represents an organopolysiloxane that is alkoxy-modified at one or both ends; these organopolysiloxanes may be of one type used alone, or may be of two or more types used together. Organopolysiloxanes that are dialkoxy or trialkoxy-modified at one or both ends are preferred. Organopolysiloxanes that are trialkoxy-modified at one or both ends are more preferred.

Exemplary terminal alkoxy-modified organopolysiloxanes of formula (I) that may be used in the invention include organopolysiloxanes that are monoalkoxy-modified at one end [in formula (I), $R^1$ and $R^2$ are $CH_3$, X is $CH_3$ or —O—$SiR^1_2$(O $R^2$), Y is —$SiR^1_2(OR^2)$, and m is an integer of 2 or more], organopolysiloxanes that are dialkoxy-modified at one end [in formula (I), $R^1$ and $R^2$ are $CH_3$, X is $CH_3$ or —O—$SiR^1_2(OR^2)$, Y is —$SiR^1$(O $R^2$)$_2$, and m is an integer of 2 or more], organopolysiloxanes that are trialkoxy-modified at one end [in formula (I), $R^1$ and $R^2$ are $CH_3$, X is $CH_3$ or —O—$SiR^1_2(OR^2)$, Y is —$Si(OR^2)_3$, and m is an integer of 2 or more], organopolysiloxanes that are monoalkoxy-modified at both ends [in formula (I), $R^1$ and $R^2$ are $CH_3$, X and Y are —$SiR^1_2(OR^2)$, and m is an integer of 2 or more], organopolysiloxanes that are dialkoxy-modified at both ends [in formula (I), $R^1$ and $R^2$ are $CH_3$, X and Y are —$SiR^1(OR^2)_2$, and m is an integer of 2 or more], and organopolysiloxanes that are trialkoxy-modified at both ends [in formula (I), $R^1$ and $R^2$ are $CH_3$, X and Y are —$Si(OR^2)_3$, and m is an integer of 2 or more].

The organopolysiloxane of general formula (II) below that may be used as component (C) is an ingredient which, along with carrying out surface hydrophobizing treatment on component (B), enhances the component (B) wettability by and dispersibility in component (A). Such organopolysiloxanes may be of a single type used alone, or may be of two or more types used together. It should be noted that component (C) differs from above component (A) in that it includes an alkylene structure [Si—$CH_bH_{2b}$—Si (wherein b is an integer of 2 or more)].

[Chemical Formula 11]

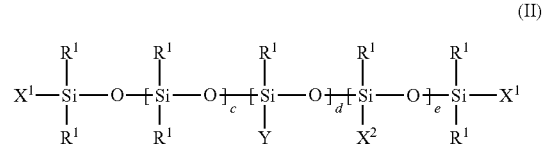

In formula (II), each $R^1$ is independently a monovalent organic group of 1 to 20 carbon atoms, $X^1$ and $X^2$ are each is independently $R^1$ or a group of formula (i) below

[Chemical Formula 12]

(wherein $R^1$ is as defined above; each $R^2$, which may be the same or different, is a hydrogen atom or an unsubstituted or substituted, saturated or unsaturated monovalent hydrocarbon group of 1 to 20 carbon atoms; a is an integer from 1 to 3; and b is an integer of 2 or more), each Y is independently a group of formula (ii) below

[Chemical Formula 13]

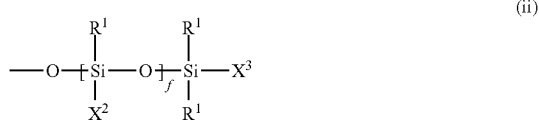
(ii)

(wherein $R^1$ and $X^2$ are as defined above, $X^3$ is the same as $X^1$, and f is an integer of 0 or more), and c, d and e are each integers of 0 or more, with the proviso that at least one of $X^1$ to $X^3$ is a group of formula (i).

$R^1$ and $R^2$ are exemplified in the same way as above.

integers from 0 to 80, and even more preferably integers from 0 to 50. The value c+d+e+(d×f) is preferably an integer from 0 to 300, and more preferably an integer from 0 to 150.

The organopolysiloxane of formula (II) has at least one, preferably from 1 to 50, and more preferably from 1 to 25, groups of above formula (i).

Also, the organopolysiloxane of formula (II) preferably has from 1 to 150, and especially from 1 to 75, organoxy groups $OR^2$ or hydroxyl groups per molecule.

The organopolysiloxane of general formula (II) may be an organopolysiloxane that is organoxy or hydroxy-modified at both ends, on side chains, or at both ends and on side chains. Organopolysiloxanes that are dialkoxy or trialkoxy-modified at both ends, on side chains, or at both ends and on side chains are preferred; organopolysiloxanes that are trialkoxy-modified at both ends, on side chains, or at both ends and on side chains are more preferred.

Examples of specific structures having formula (II) include, but are not limited to, those shown below. In the formulas below, Me, OH and OMe stand for, respectively: a methyl group, a hydroxyl group and a methoxy group.

[Chemical Formula 14]

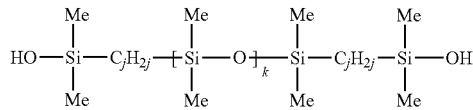 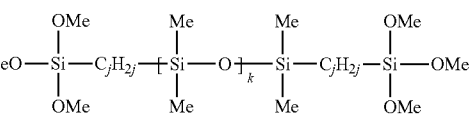

[Chemical Formula 15]

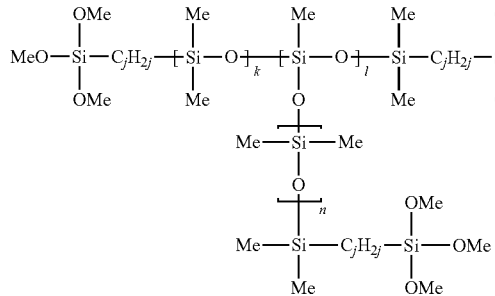 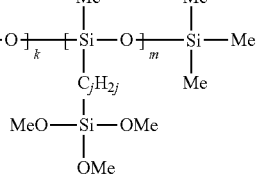

[Chemical Formula 16]

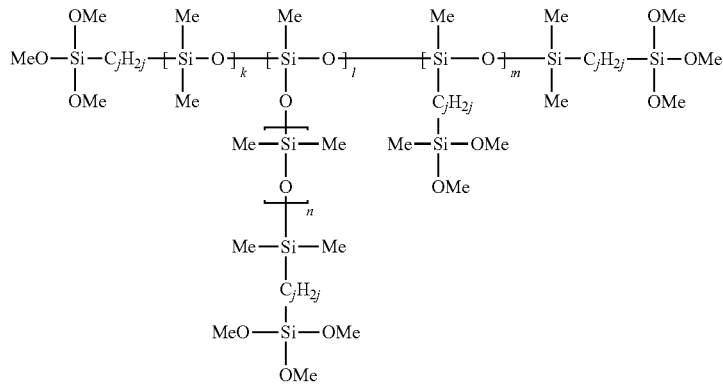

The subscript "a" is as defined above, and "b" is an integer of 2 or more, preferably from 2 to 30, and more preferably from 2 to 20.

The subscripts "c" and "f" are each integers of 0 or more, preferably integers from 0 to 100, more preferably integers from 2 to 80, and even more preferably integers from 2 to 50. The subscripts "d" and "e" are each integers of 0 or more, preferably integers from 0 to 100, more preferably In these formulas, j≥2, k≥0, l≥1, m≥1 and n≥1.

Component (C) is used in an amount, per 100 parts of component (A), of from 0.001 to 5 parts by weight, and preferably from 0.01 to 3 parts by weight. At less than 0.001 part by weight, a sufficient defoaming performance is not obtained, whereas at more than 5 parts by weight, the defoaming performance of the resulting silicone oil compound worsens.

The inventive method for producing a silicone oil compound is characterized by carrying out compounding in two stages: a first compounding and a second compounding. The main purpose of the first compounding is to adsorb or fix the organopolysiloxane serving as component (C) onto the surface of the fine silica powder serving as component (B). The main purpose of the second compounding is to fix reactive groups from polymer ingredients such as the organopolysiloxane serving as component (A) and from component (C) onto the surface of the fine silica powder.

That is, the method of the invention, which produces an oil compound for a defoamer, includes:

(1) a first step of kneading together
   (A) 100 parts by weight of an inherently hydrophobic organopolysiloxane having a viscosity at 25° C. of from 10 to 100,000 mm²/s,
   (B) from 1 to 30 parts by weight of a fine silica powder having a specific surface area of at least 50 m²/g,
   (C) from 0.001 to 5 parts by weight of an organopolysiloxane of general formula (I) and/or (II) above, and
   (D) from 0 to 5 parts by weight of water;
(2) a second step of heat-treating the kneaded mixture obtained in the first step, the first and second steps together constituting a first compounding;
(3) a third step of kneading (E) from 0.001 to 5 parts by weight of an alkaline catalyst or an acid catalyst (per 100 parts by weight of component (A)) into the kneaded mixture obtained in the second step;
(4) a fourth step of heat-treating the kneaded mixture obtained in the third step, the third and fourth steps together constituting a second compounding; and
(5) a fifth step of kneading an acid or an alkali as a neutralizing agent into the kneaded mixture obtained in the fourth step.

Defoamer compositions having an excellent initial defoaming ability and an excellent defoaming persistence even in foaming liquids, especially alkaline foaming liquids, can be obtained using silicone oil compounds produced by way of these first to fifth steps.

Here, components (A) to (C) are as described above.

Component (D)

The water serving as component (D) promotes the hydrolysis of component (C) and has the role of increasing the speed of component (B) surface treatment. Because cases in which water such as adsorbed water is included in component (B) are conceivable, component (D) need not be essential.

The amount of component (D) used per 100 parts by weight of component (A) is from 0 to 5 parts by weight, preferably from 0.01 to 5 parts by weight, and more preferably from 0.01 to 3 parts by weight.

Component (E)

Component (E) is an alkaline catalyst or an acid catalyst. Examples of alkaline catalysts that may be used include oxides, hydroxides, alkoxides and siliconates of alkali metal and alkaline earth metals which are known alkaline catalysts employed in polysiloxane equilibration reactions. Potassium siliconate and potassium hydroxide are preferred. Examples of acid catalysts include organic acids such as acetic acid, butyric acid, maleic acid and citric acid, and inorganic acids such as hydrochloric acid, nitric acid, phosphoric acid and sulfuric acid. An alkaline catalyst is preferable to an acid catalyst as component (E).

Component (E) is used in an amount, per 100 parts by weight of component (A), of from 0.001 to 5 parts by weight, preferably from 0.01 to 5 parts by weight, more preferably from 0.01 to 3 parts by weight, and even more preferably from 0.05 to 3 parts by weight. At less than 0.001 part by weight, a sufficient catalytic effect is not achieved, whereas the use of more than 5 parts by weight is not beneficial in terms of cost because there is little additional increase in the effects of the catalyst.

As for the neutralizing agent, hydrochloric acid, sulfuric acid, nitric acid, phosphoric acid, acetic acid or a carboxylic acid that is solid at room temperature may be used as the neutralizing agent for an alkaline catalyst. A carboxylic acid that is solid at room temperature is preferred. Examples of carboxylic acids that are solid at room temperature which may be used include monocarboxylic acids such as benzoic acid; dicarboxylic acids such as oxalic acid, malonic acid, succinic acid, glutaric acid, adipic acid, phthalic acid, isophthalic acid and terephthalic acid; and tricarboxylic acids such as citric acid, isocitric acid, oxalosuccinic acid and aconitic acid. Of these, succinic acid, which has a low acid dissociation constant and is thus a strong acid, and which moreover is readily available, is preferred. In addition, oxides, hydroxides, alkoxides and siliconates of alkali metals and alkaline earth metals may be used as the neutralizing agent for an acid catalyst, with potassium siliconate and potassium hydroxide being preferred.

The neutralizing agent should be used in an amount that is capable of neutralizing component (E).

In this case, in the first step, components (A) to (C) or components (A) to (D) are kneaded together at a temperature of preferably not more than 100° C., and more preferably not more than 80° C. There is no particular need to apply heat from the exterior, with kneading at room temperature (e.g., 10 to 30° C.) being possible. The temperature that rises due to heat generation within the system owing to frictional resistance during kneading should be adjusted to not more than 100° C., and especially not more than 80° C. When kneading is carried out at more than 100° C., component (C) may vaporize and cease to work effectively. The treatment time in this first step depends to a large degree on the kneading apparatus and scale, and so cannot be strictly specified, although a treatment time of generally about 0.1 to 3 hours, especially about 0.5 to 2 hours, is desirable.

The second step is a heat treatment step for fixing, on the surface of component (B), the component (C) that has been hydrolyzed by adsorbed water in component (B), by component (D), or by both. Heat treatment is carried out at from 120 to 200° C., preferably 140 to 180° C., and preferably while kneading. At a heat treatment temperature below 120° C., the defoaming performance may be poor; at a temperature in excess of 200° C., component (A) may deteriorate (decompose). The treatment time in this second step depends to a large degree on the kneading apparatus and scale, and so cannot be strictly specified, although a treatment time of generally about 0.1 to 4 hours, especially about 0.5 to 2 hours, is desirable.

The third step consists of adding component (E) to the kneaded material obtained in the second step, and thereby rendering the oil compound system alkaline or acidic. In the third step as well, for the same reason as in the first step, kneading is preferably carried out at a temperature of not more than 100° C. Here too, kneading may be carried out at room temperature (e.g., 10 to 30° C.). The treatment time in this third step also depends to a large degree on the kneading apparatus and scale, and so cannot be strictly specified, although a treatment time of generally about 0.05 to 3 hours, especially about 0.1 to 2 hours, is desirable.

The fourth step is a heat treatment step for fixing polymer ingredients such as the organopolysiloxane of component (A) and reactive groups from component (C) onto the surface of the fine silica powder of component (B). In this step, heat treatment is carried out at 120 to 200° C., and preferably 140 to 180° C., preferably while kneading. At a heat treatment temperature below 120° C., the defoaming performance may be poor; at a temperature in excess of 200° C., component (A) may deteriorate (decompose). The treatment time in this fourth step depends to a large degree on the kneading apparatus and scale, and so cannot be strictly specified, although a treatment time of generally about 0.1 to 6 hours, especially about 2 to 4 hours, is desirable.

The fifth step is a step that neutralizes the alkaline catalyst or acid catalyst used in the second compounding. In the fifth step as well, for the same reasons as in the first and third steps, kneading is preferably carried out at a temperature of not more than 100° C. Here too, kneading at room temperature (e.g., from 10 to 30° C.) is preferred. The treatment time in this fifth step depends to a large degree on the kneading apparatus and scale, and so cannot be strictly specified, although a treatment time of generally about 0.1 to 4 hours, especially about 0.5 to 3 hours, is desirable.

In the production method of the invention, examples of the kneading machine used to carry out kneading include, but are not particularly limited to, planetary mixers, kneaders, compression kneaders, twin-screw kneaders, intensive mixers, agitating/homogenizing mixers, dispersion mixers and planetary dispersion mixers. These kneading machines may be used in any step from the first step to the neutralization step.

The silicone oil compound obtained by kneading and heat-treating the above ingredients is used directly as is, or may be used as a defoamer composition which contains the silicone oil compound. Illustrative examples of the defoamer composition include solution-type defoamer compositions in which the silicone oil compound is dispersed in a suitable solvent, self-emulsifying defoamer compositions resulting from use of the silicone oil compound together with a polyoxyalkylene group-modified organopolysiloxane, and emulsion-type defoamer compositions obtained by a widely known emulsifying technique.

Here, when producing a solution-type defoamer composition by dispersion in a suitable solvent, the solvent is one which dissolves the inherently hydrophobic organopolysiloxane serving as component (A). Examples of such solvents include toluene, xylene, hexane, chloroform, 2-butanone and 4-methyl-2-pentanone.

When producing a solution-type defoamer composition, the content of the silicone oil compound therein is preferably from 5 to 80 wt %, and more preferably from 30 to 70 wt %, of the overall defoamer composition. At a silicone oil compound content that is too low, the defoaming performance as a defoamer composition may be poor. On the other hand, at too high a content, it may not be possible to satisfy the main purpose as a solution-type defoamer composition of increasing the dispersibility of the silicone oil compound.

When producing a self-emulsifying type defoamer composition by using the silicone oil compound together with a polyoxyalkylene group-modified organopolysiloxane, exemplary polyoxyalkylene group-modified organopolysiloxanes include those of general formula (III) below.

$$R^4_2R^6SiO-(R^4_2SiO)_o-(R^4R^5SiO)_p-SiR^4_2R^6 \quad (III)$$

In formula (III), each $R^4$ is the same or a different, unsubstituted or substituted monovalent hydrocarbon group of 1 to 18, especially 1 to 15, carbon atoms. Specific examples include alkyl groups such as methyl, ethyl, propyl, isopropyl, butyl, isobutyl, pentyl, hexyl, heptyl, octyl, nonyl, decyl, dodecyl, tridecyl, tetradecyl, hexadecyl and octadecyl groups; cycloalkyl groups such as a cyclohexyl group; alkenyl groups such as vinyl and allyl groups; aryl groups such as phenyl and tolyl groups; aralkyl groups such as styryl and α-methylstyryl groups; and any of these group on which some or all hydrogen atoms bonded to carbon atoms are substituted with halogen atoms, cyano groups, amino groups or the like, such as chloromethyl, 3-chloropropyl, 3,3,3-trifluoropropyl, cyanoethyl, 3-aminopropyl and N-(β-aminoethyl)-γ-aminopropyl groups.

$R^5$ is a polyoxyalkylene group of general formula (IV) below.

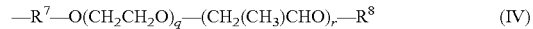

$$-R^7-O(CH_2CH_2O)_q-(CH_2(CH_3)CHO)_r-R^8 \quad (IV)$$

In formula (IV), $R^7$ is a divalent hydrocarbon group of 2 to 6 carbon atoms that is exemplified by alkylene groups and alkenylene groups. Specific examples include ethylene, propylene, butylene, pentylene and hexylene groups. $R^8$ is a hydrogen atom, an alkyl group of 1 to 6 carbon atoms, an acetyl group or an isocyan group. Examples of alkyl groups include methyl, ethyl, propyl, butyl and pentyl groups. The subscripts "q" and "r" are positive numbers for the respective recurring units, which may be polymerized as blocks or randomly, such that the degree of polymerization thereof (q+r) satisfies the conditions 3≤q+r ≤80, and preferably 5≤q+r≤60, and moreover such as to satisfy the condition q/r=2/8 to 8/2, and preferably q/r=2.5/7.5 to 7.5/2.5.

$R^6$ is a group similar to $R^4$ or $R^5$, this being a hydroxyl group or an alkoxy group of 1 to 6 carbon atoms. Illustrative examples include the groups mentioned above for $R^4$ and $R^5$, and alkoxy groups such as methoxy, ethoxy, propoxy and butoxy groups.

In formula (III), the subscript "o" is an integer from 5 to 200, and preferably from 20 to 150, and the subscript "p" is an integer from 1 to 30, and preferably from 1 to 20.

This polyoxyalkylene group-modified organopolysiloxane may be of one type used alone, or a mixture of two or more may be used. Use can be made of one having a viscosity at 25° C., as measured with an Ostwald viscometer, of from 10 to 10,000 mm²/s, preferably from 50 to 8,000 mm²/s, and more preferably from 500 to 5,000 mm²/s.

Illustrative examples of polyoxyalkylene group-modified organopolysiloxanes include, but are not limited to, the following:

$(CH_3)_3SiO-[(CH_3)_2SiO]_{30}-[(CH_3)R'SiO]_5-Si(CH_3)_3$,
 where R': $-C_3H_6O-(C_2H_4O)_{30}-(C_3H_6O)_{10}-C_4H_9$;
$(CH_3)_3SiO-[(CH_3)_2SiO]_{30}-[(CH_3)R'SiO]_3-Si(CH_3)_3$,
 where R': $-C_3H_6O-(C_2H_4O)_{20}-(C_3H_6O)_{20}-C_4H_9$;
$(CH_3)_3SiO-[(CH_3)_2SiO]_{40}-[(CH_3)R'SiO]_4-Si(CH_3)_3$,
 where R': $-C_3H_6O-(C_3H_4O)_{21}-(C_3H_6O)_7-COCH_3$;
$(CH_3)_3SiO-[(CH_3)_2SiO]_{50}-[(CH_3)R''SiO]_6-[(CH_3)R'''SiO]_1-Si(CH_3)_3$,
 where R'': $-C_3H_6O-(C_2H_4O)_{32}-(C_3H_6O)_9-C_4H_9R'''$: $-C_{12}H_{25}$;
$(CH_3)_3SiO-[(CH_3)_2SiO]_{135}-[(CH_3)R'SiO]_{15}-Si(CH_30)_3$,
 where R': $-C_3H_6O-(C_2H_4O)_{21}-(C_3H_6O)_{21}-CH_3$;
$(CH_3)_3SiO-[(CH_3)_2SiO]_{30}-[(CH_3)R'SiO]_5-Si(CH_3)_3$,
 where R':$-C_3h_6O-(C_2H_4O)_{25.5}-(C_3H_6O)_{8.5}-C_4H_9$; and
$(CH_3)_3SiO-[(CH_3)_2SiO]_{27}-[(CH_3)R'SiO]_3-Si(CH_3)_3$,
 where R': $-C_3H_6O-(C_2H_4O)_{23}-(C_3H_6O)_{23}-C_4H_9$.

In a self-emulsifying defoamer composition, the above polyoxyalkylene group-modified organopolysiloxane may be of one type used alone, or a mixture of two or more may be used. The content is preferably from 0 to 95 wt %, and more preferably from 0 to 70 wt %, of the overall self-emulsifying defoamer composition. At too low a content, it may not be possible to satisfy the main purpose of the self-emulsifying defoamer composition, which is to increase the dispersibility of the silicone oil compound. On the other hand, at too high a content, the defoaming performance as a defoamer composition may be poor. When such a polyoxyalkylene polymer is included, the content may be set to an effective amount, although including at least 20 wt % is preferred.

In self-emulsifying defoamer compositions resulting from the use of the silicone oil compound together with a polyoxyalkylene group-modified organopolysiloxane, use can also be made of polyoxyalkylene polymers such as HO—[CH$_2$(CH$_3$)CHO]$_{35}$—H,
HO—[CH$_2$(CH$_3$)CHO]$_{70}$—H,
HO—(CH$_2$CH$_2$O)$_4$—[CH$_2$(CH$_3$)CHO]$_{30}$—H,
HO—(C$_2$H$_4$O)$_{25}$—(C$_3$H$_5$O)$_{35}$—H,
HO—(C$_3$H$_6$O)$_{30}$—H,
CH$_2$=CHCH$_2$O—(CH$_2$CH$_2$O)$_{32}$—[CH$_2$(CH$_3$)CHO]$_8$—H,
CH$_2$=CHCH$_2$O—(CH$_2$CH$_2$O)$_{22}$—[CH$_2$(CH$_3$)CHO]$_{22}$—C$_4$H$_9$, and
CH$_2$=CHCH$_2$O—(CH$_2$CH$_2$O)$_{10}$—CH$_3$;

and nonionic surfactants such as sorbitan fatty acid esters, glycerol fatty acid esters, polyglycerol fatty acid esters, propylene glycol fatty acid esters, sucrose fatty acid esters, polyoxyethylene alkyl ethers, polyoxyethylene oxypropylene alkyl ethers, polyoxyethylene fatty acid esters, polyoxyethylene sorbitan fatty acid esters, polyoxyethylene glycerol fatty acid esters, polyoxyethylene propylene glycol fatty acid esters, polyoxyethylene castor oils and polyoxyethylene hydrogenated castor oils.

The composition formulas illustrated above are examples and are not intended to limit the present invention.

In self-emulsifying defoamer compositions, the polyoxyalkylene polymer is included in order to increase the dispersibility of the silicone oil compound. A single such polyoxyalkylene polymer may be used alone, or a mixture of two or more may be used. The content is preferably from 0 to 95 wt %, and more preferably from 0 to 70 wt %, of the overall self-emulsifying defoamer composition. At a content that is too high, the defoaming performance as a defoamer composition may worsen. When such a polyoxyalkylene polymer is included, the content may be set to an effective amount, although including at least 20 wt % is preferred.

Moreover, in self-emulsifying defoamer compositions, the nonionic surfactant is included in order to increase the dispersibility of the silicone oil compound. A single such nonionic surfactant may be used alone, or a mixture of two or more may be used. The content is preferably from 0 to 95 wt %, and more preferably from 0 to 70 wt %, of the overall self-emulsifying defoamer composition. At a content that is too high, the defoaming performance as a defoamer composition may worsen. When such a nonionic surfactant is included, the content may be set to an effective amount, although including at least 20 wt % is preferred.

When producing a self-emulsifying defoamer composition, the silicone oil compound content is preferably from 5 to 80 wt %, more preferably from 10 to 70 wt %, and even more preferably from 20 to 60 wt%, of the overall self-emulsifying defoamer composition. At a silicone oil compound content that is too low, the defoaming performance as a defoamer composition may be poor. At a content that is too high, it may not be possible to satisfy the main purpose of the self-emulsifying defoamer composition, which is to increase the dispersibility of the silicone oil compound.

When producing an emulsion-type defoamer composition, a commonly known method may be employed, in which case the above-described polyoxyalkylene group-modified organopolysiloxane, polyoxyalkylene polymer, nonionic surfactant or the like may be used as the emulsifying agent to emulsify the silicone oil compound.

In an emulsion-type defoamer composition, the polyoxyalkylene group-modified organopolysiloxane may be of a single type used alone, or a mixture of two or more may be used. The content thereof, based on the overall emulsion-type defoamer composition, is preferably from 0 to 30 wt %, and more preferably from 1 to 20 wt %. At a content in excess of 30 wt %, the defoaming performance of the composition may worsen.

Also, in emulsion-type defoamer compositions, the above polyoxyalkylene polymer serves as a co-emulsifying agent; a single type may be used alone, or a mixture of two or more may be used. The content thereof, based on the overall emulsion-type defoamer composition, is preferably from 0 to 40 wt %, and more preferably from 0 to 20 wt %. At a content in excess of 40 wt %, the emulsification characteristics of the composition may worsen. When such a polyoxyalkylene polymer is included, it may be used in an effective amount, with the inclusion of at least 5 wt % being preferred.

Moreover, in emulsion-type defoamer compositions, the above nonionic surfactant is for dispersing the silicone oil compound in water; a single type may be used alone, or a mixture of two or more may be used. The content thereof, based on the overall emulsion-type defoamer composition, is preferably from 0 to 20 wt %, and more preferably from 1 to 12 wt %. At a content in excess of 20 wt %, the viscosity of the defoamer composition may rise and the workability may worsen.

When producing an emulsion-type defoamer composition, the content of the silicone oil compound is preferably from 5 to 50 wt %, and more preferably from 10 to 40 wt % of the overall emulsion type defoamer composition. When the silicone oil compound content is too low, the defoaming performance as a defoamer composition may be poor. When the content is too high, the viscosity of the defoamer composition may rise and the workability may worsen.

In an emulsion-type defoamer composition, it is essential to add the water needed to emulsify the various ingredients, including the silicone oil compound, polyoxyalkylene group-modified organopolysiloxane, polyoxyalkylene polymer and nonionic surfactant, in the emulsion-type defoamer composition. The amount of water is the balance of the composition with respect to the combined content of these ingredients, such water being added in an amount of preferably 50 to 2,000 parts by weight, and more preferably 80 to 400 parts by weight, per 100 parts by weight of the sum of the ingredients.

Emulsion-type defoamer compositions can be prepared by mixing together predetermined amounts of the ingredients other than water, and stirring and emulsifying by a known means, such as a homogenizing mixer, homogenizer, colloid mill or other mixer/disperser, under optional heating. A method of preparation by uniformly mixing and dispersing predetermined amounts of the ingredients other than water, then adding some of the water, carrying out stirring and emulsification, and then adding the remainder of the water is especially preferred.

A small amount of preservative/germicide may be optionally added to emulsion-type defoamer compositions in order to protect against spoilage. Illustrative examples of such preservatives/germicides include sodium hypochlorite, sorbic acid, potassium sorbate, salicylic acid, sodium salicylate, benzoic acid, sodium benzoate, parabens and isothiazoline compounds. The amount of such addition is preferably from 0 to 0.05 wt %, and especially from 0.005 to 0.5 wt %, of the overall emulsion-type defoamer composition.

A small amount of a thickener may be optionally added to emulsion-type defoamer compositions for the purpose of increasing the thickness. Illustrative examples of such thickeners include polyacrylic acid, sodium polyacrylate, acrylic acid-methacrylic acid copolymers, carboxymethylcellulose sodium, methyl cellulose, hydroxypropyl methylcellulose, hydroxyethyl methylcellulose, xantham gun and guar gum. The amount of addition is preferably from 0 to 1.0 wt %, and especially from 0.01 to 0.5 wt %, of the overall emulsion-type defoamer composition.

EXAMPLES

Examples and Comparative Examples are given below to more concretely illustrate the invention, although the invention is not limited by these Examples. In the following Examples, the viscosity is a value measured at 25° C. with an Ostwald viscometer, and the average degree of polymerization is a value determined as the polystyrene-equivalent number-average degree of polymerization in gel permeation chromatographic (GPC) analysis. In the formulas below, Me stands for a methyl group and OMe stands for a methoxy group.

Example 1

The following were kneaded for one hour using a planetary mixer: 100 parts by weight of, as an inherently hydrophobic organopolysiloxane, a dimethylpolysiloxane capped at both ends of the molecular chain with trimethylsilyl groups and having a viscosity of 10,000 mm$^2$/s, 5 parts by weight of AEROSIL 300 (from Nippon Aerosil Co., Ltd.; specific surface area, 300 m$^2$/g) as a fine silica powder, 0.3 part by weight of a terminal trialkoxy-modified organopolysiloxane (in formula (I), $R^1$ and $R^2$ are $CH_3$, X is Y—O—, Y is —Si(OR$^2$)$_3$, and m is 10) as a silica surface treatment agent, and 0.3 part by weight of water. The temperature was then raised to 150° C. and kneading was continued for 2 hours. The system was cooled to not more than 100° C., following which 2 parts by weight of potassium siliconate containing 3 wt % of potassium hydroxide was added as an alkaline catalyst and the mixture was kneaded for 0.1 hour at not more than 100° C. Next, the kneaded material was raised to a temperature of 150° C., then held at that level and kneaded for a total of 4 hours after raising the temperature. The material was cooled to not more than 100° C., then neutralized by adding succinic acid and kneading for 3 hours, giving Silicone Oil Compound (a-1).

Self-Emulsifying Defoamer Composition (A) was prepared by mixing the following at room temperature into 30 parts by weight of this Silicone Oil Compound (a-1): 70 parts by weight of Polyoxyalkylene-Modified Organosiloxane (a-2) having an average composition expressed by the formula

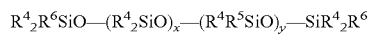

(wherein $R^4$ and $R^6$ are —$CH_3$, $R^5$ is —$C_3H_6O(C_2H_4O)_{21}$ $(C_3H_6O)_{21}CH_3$, x is 135 and y is 15) and a viscosity of 2,500 mm$^2$/s.

Example 2

Emulsion-Type Defoamer Composition (B) was prepared by heating and dissolving a mixture of 20 parts by weight of Silicone Oil Compound (a-1) in Example 1, 4 parts by weight of sorbitan monostearate and 6 parts by weight of is polyoxyethylene (55) monostearate, subsequently adding 70 parts by weight of water, and stirring and emulsifying with a homogenizing mixer.

Example 3

The following were kneaded for one hour using a planetary mixer: 100 parts by weight of, as an inherently hydrophobic organopolysiloxane, a dimethylpolysiloxane capped at both ends of the molecular chain with trimethylsilyl groups and having a viscosity of 8,000 mm$^2$/s, 12 parts by weight of AEROSIL 200 (from Nippon Aerosil Co., Ltd.; specific surface area, 200 m$^2$/g) as a fine silica powder, and 0.72 part by weight of a terminal trialkoxy-modified organopolysiloxane (in formula (I), $R^1$ and $R^2$ are $CH_3$, X is $R^1$, Y is —Si(OR$^2$)$_3$, and m is 30) as a silica surface treatment agent. The temperature was then raised to 150° C. and kneading was continued for 2 hours. The system was cooled to not more than 100° C., following which 3 parts by weight of potassium siliconate containing 3 wt % of potassium hydroxide was added as an alkaline catalyst and the mixture was kneaded for 0.1 hour at not more than 100° C. The kneaded material was raised to a temperature of 150° C. and kneaded for 2 hours at 150° C. The material was cooled to not more than 100° C., then neutralized by adding succinic acid and kneading for 3 hours, giving Silicone Oil Compound (c-1).

Self-Emulsifying Defoamer Composition (C) was prepared by mixing the following at room temperature into 30 parts by weight of this Silicone Oil Compound (c-1): 50 parts by weight of Polyoxyalkylene-Modified Organosiloxane (c-2) having an average composition expressed by the formula

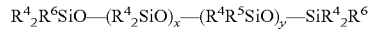

(wherein $R^4$ and $R^6$ are —$CH_3$, $R^5$ is —$C_3H_6O(C_2H_4O)_{25.5}$ $(C_3H_6O)_{8.5}C_4H_9$, x is 30 and y is 5) and a viscosity of 1,000 mm$^2$/s, and 20 parts by weight of Polyoxyalkylene Polymer (c-3) having an average composition expressed by the formula below.

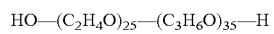

Example 4

Emulsion-Type Defoamer Composition (D) was prepared by heating and dissolving a mixture of 20 parts by weight of Silicone Oil Compound (c-1) in Example 3, 6 parts by weight of sorbitan monostearate and 6 parts by weight of polyoxyethylene (55) monostearate, subsequently adding 68 parts by weight of water, and stirring and emulsifying with a homogenizing mixer.

Example 5

The following were kneaded for one hour using a planetary mixer: 100 parts by weight of, as an inherently hydrophobic organopolysiloxane, a dimethylpolysiloxane capped at both ends of the molecular chain with trimethylsilyl groups and having a viscosity of 10,000 mm²/s, 5 parts by weight of AEROSIL 300 (from Nippon Aerosil Co., Ltd.; specific surface area, 300 m²/g) as a fine silica powder, 0.3 part by weight of a terminal trialkoxy-modified organopolysiloxane (in formula (I), $R^1$ and $R^2$ are $CH_3$, X is $R^1$, Y is —$SiR^1(OR^2)_2$, and m is 30) as a silica surface treatment agent, and 0.3 part by weight of water. The temperature was then raised to 150° C. and kneading was continued for 2 hours. The system was cooled to not more than 100° C., following which 3 parts by weight of potassium siliconate containing 3 wt % of potassium hydroxide was added as an alkaline catalyst and the mixture was kneaded for 0.1 hour at not more than 100° C. Next, the kneaded material was raised to a temperature of 150° C. and kneaded for 2 hours at 150° C. The material was cooled to not more than 100° C., then neutralized by adding succinic acid and kneading for 3 hours, giving Silicone Oil Compound (e-1).

Self-Emulsifying Defoamer Composition (E) was prepared by mixing the following at room temperature into 30 parts by weight of this Silicone Oil Compound (e-1): 70 parts by weight of Polyoxyalkylene-Modified Organosiloxane (e-2) having an average composition expressed by the formula $$R^4{}_2R^6SiO—(R^4{}_2SiO)_x—(R^4R^5SiO)_y—SiR^4{}_2R^6$$

(wherein $R^4$ and $R^6$ are —$CH_3$, $R^5$ is —$C_3H_6O(C_2H_4O)_{21}(C_3H_6O)_{21}CH_3$, x is 135 and y is 15) and a viscosity of 2,500 mm²/s.

Example 6

Emulsion-Type Defoamer Composition (F) was prepared by heating and dissolving a mixture of 20 parts by weight of Silicone Oil Compound (e-1) in Example 5, 4 parts by weight of sorbitan monostearate and 6 parts by weight of polyoxyethylene (55) monostearate, subsequently adding 70 parts by weight of water, and stirring and emulsifying with a homogenizing mixer.

Comparative Example 1

The following were kneaded using a planetary mixer for 3 hours at 150° C. and under a nitrogen gas atmosphere: 100 parts by weight of, as an inherently hydrophobic organopolysiloxane, a dimethylpolysiloxane capped at both ends of the molecular chain with trimethylsilyl groups and having a viscosity of 10,000 mm²/s, 5 parts by weight of AEROSIL 300 (from Nippon Aerosil Co., Ltd.; specific surface area, 300 m²/g) as a fine silica powder, and 2 parts by weight of, as an alkaline catalyst, potassium siliconate containing 3 wt % of potassium hydroxide. The system was cooled to not more than 100° C. and neutralized with succinic acid, giving Silicone Oil Compound (g-1).

Self-Emulsifying Defoamer Composition (G) was prepared by mixing the following at room temperature into 30 parts by weight of this Silicone Oil Compound (g-1): 70 parts by weight of Polyoxyalkylene-Modified Organosiloxane (g-2) having an average composition expressed by the formula $$R^4{}_2R^6SiO—(R^4{}_2SiO)_x—(R^4R^5SiO)_y—SiR^4{}_2R^6$$

(wherein $R^4$ and $R^6$ are —$CH_3$, $R^5$ is —$C_3H_6O(C_2H_4O)_{21}(C_3H_6O)_{21}CH_3$, x is 135 and y is 15) and a viscosity of 2,500 mm²/s.

Comparative Example 2

Emulsion-Type Defoamer Composition (H) was prepared by heating and dissolving a mixture of 20 parts by weight of Silicone Oil Compound (g-1) in Comparative Example 1, 4 parts by weight of sorbitan monostearate and 6 parts by weight of polyoxyethylene (55) monostearate, subsequently adding 68 parts by weight of water, and stirring and emulsifying with a homogenizing mixer.

Defoamer Compositions (A) to (H) obtained in Examples 1 to 6 and Comparative Examples 1 and 2 were evaluated by the following methods. The results are presented in Table 1.

[Evaluation Methods]

A 100 mL glass bottle was charged with 50 g of softwood sulfite waste liquor adjusted to a nonvolatiles content of 8 wt %, and this was pre-heated at 80° C.

Defoaming Ability (Initial):

The defoamer composition was added in an amount corresponding to 0.1 wt % of the active ingredient (silicone oil compound) to the test liquid preheated at 80° C., following which the bottle was shaken for 30 seconds on a shaker to induce foaming, and the defoaming ability was evaluated by measuring the foam height (liquid level+foam) and the time until foam knockdown.

Defoaming Ability (Persistence):

The mixtures obtained by adding various defoamer compositions in amounts corresponding to 0.1 wt % of the active ingredient (silicone oil compound) to the above sulfite waste liquor were stored at 80° C., following which these were shaken for 30 seconds on a shaker at predetermined times (after 30 minutes and after 120 minutes) to induce foaming, and the defoaming ability was evaluated by measuring the foam height (liquid level +foam) and the time until foam knockdown.

TABLE 1

| | Defoamer composition | Immediately | | After 30 minutes | | After 120 minutes | |
|---|---|---|---|---|---|---|---|
| | | Volume after shaking (mL) | Time until knockdown (seconds) | Volume after shaking (mL) | Time until knockdown (seconds) | Volume after shaking (mL) | Time until knockdown (seconds) |
| Working Example 1 | (A) | 65 | 4 | 65 | 6 | 70 | 15 |
| Working Example 2 | (B) | 60 | 3 | 60 | 5 | 65 | 12 |
| Working Example 3 | (C) | 60 | 4 | 65 | 5 | 70 | 18 |
| Working Example 4 | (D) | 60 | 3 | 60 | 4 | 65 | 14 |
| Working Example 5 | (E) | 65 | 3 | 65 | 12 | 70 | 24 |

TABLE 1-continued

| | Defoamer composition | Immediately | | After 30 minutes | | After 120 minutes | |
|---|---|---|---|---|---|---|---|
| | | Volume after shaking (mL) | Time until knockdown (seconds) | Volume after shaking (mL) | Time until knockdown (seconds) | Volume after shaking (mL) | Time until knockdown (seconds) |
| Working Example 6 | (F) | 60 | 2 | 60 | 10 | 65 | 20 |
| Comparative Example 1 | (G) | 65 | 4 | 80 | 45 | 85 | 65 |
| Comparative Example 2 | (H) | 60 | 4 | 70 | 25 | 75 | 45 |

Example 7

The following were kneaded for one hour using a planetary mixer: 100 parts by weight of, as an inherently hydrophobic organopolysiloxane, a dimethylpolysiloxane capped at both ends of the molecular chain with trimethylsilyl groups and having a viscosity of 10,000 mm²/s, 5 parts by weight of AEROSIL 300 (from Nippon Aerosil Co., Ltd.; BET specific surface area, 300 m²/g) as a fine silica powder, 0.3 part by weight of a dimethylpolysiloxane which is trimethoxy-modified at both ends and has the formula

[Chemical Formula 17]

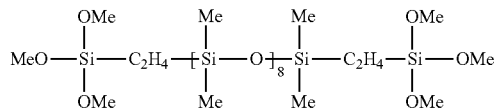

as a silica surface treatment agent, and 0.3 part by weight of water. The temperature was then raised to 150° C. and kneading was continued for 2 hours. The system was cooled to not more than 100° C., following which 2 parts by weight of potassium siliconate containing 3 wt % of potassium hydroxide was added as an alkaline catalyst and the mixture was kneaded for 0.1 hour at not more than 100° C. Next, the kneaded material was raised to a temperature of 150° C., then held at that level and kneaded for a total of 4 hours after raising the temperature. The material was cooled to not more than 100° C., then neutralized by adding 0.1 part by weight of succinic acid and kneading for 3 hours, giving Silicone Oil Compound (a-1).

Self-Emulsifying Defoamer Composition (I) was prepared by mixing the following at room temperature into 30 parts by weight of this Silicone Oil Compound (a-1): 70 parts by weight of Polyoxyalkylene-Modified Methylpolysiloxane (a-2) having an average composition expressed by the formula

[Chemical Formula 18]

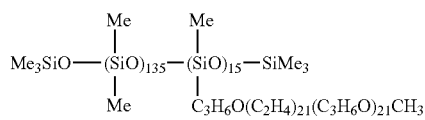

and a viscosity of 2,500 mm²/s.

Example 8

Emulsion-Type Defoamer Composition (J) was prepared by heating and dissolving a mixture of 20 parts by weight of Silicone Oil Compound (a-1) from Example 7, 4 parts by weight of sorbitan monostearate and 6 parts by weight of polyoxyethylene (55) monostearate, subsequently adding 70 parts by weight of water, and stirring and emulsifying with a homogenizing mixer.

Example 9

The following were kneaded for one hour using a planetary mixer: 100 parts by weight of, as an inherently hydrophobic organopolysiloxane, a dimethylpolysiloxane capped at both ends of the molecular chain with trimethylsilyl groups and having a viscosity of 8,000 mm²/s, 12 parts by weight of AEROSIL 200 (from Nippon Aerosil Co., Ltd.; BET specific surface area, 200 m²/g) as a fine silica powder, and 0.72 part by weight of a dimethylpolysiloxane that is trimethoxy-modified at both ends and has the formula

[Chemical Formula 19]

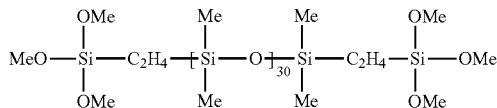

as a silica surface treatment agent. The temperature was then raised to 150° C. and kneading was continued for 2 hours. The system was cooled to not more than 100° C., following which 3 parts by weight of potassium siliconate containing 3 wt % of potassium hydroxide was added as an alkaline catalyst and the mixture was kneaded for 0.1 hour at not more than 100° C. Next, the kneaded material was raised to a temperature of 150° C. and kneaded for 2 hours at 150° C. The material was cooled to not more than 100° C., then neutralized by adding 0.15 part by weight of succinic acid and kneading for 3 hours, giving Silicone Oil Compound (c-1).

Self-Emulsifying Defoamer Composition (K) was prepared by mixing the following at room temperature into 30 parts by weight of this Silicone Oil Compound (c-1): 50 parts by weight of Polyoxyalkylene-Modified Methylpolysiloxane (c-2) having an average composition expressed by the formula

[Chemical Formula 20]

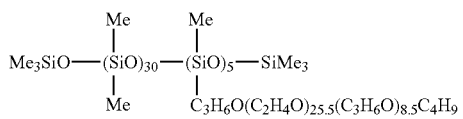

and a viscosity of 1,000 mm²/s, and 20 parts by weight of Polyoxyalkylene Polymer (c-3) having an average composition expressed by the formula below.

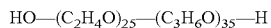
HO—(C₂H₄O)₂₅—(C₃H₆O)₃₅—H

Example 10

Emulsion-Type Defoamer Composition (L) was prepared by heating and dissolving a mixture of 20 parts by weight of Silicone Oil Compound (c-1) from Example 9, 6 parts by weight of sorbitan monostearate and 6 parts by weight of polyoxyethylene (55) monostearate, subsequently adding 68 parts by weight of water, and stirring and emulsifying with a homogenizing mixer.

Example 11

The following were kneaded for one hour using a planetary mixer: 100 parts by weight of, as an inherently hydrophobic organopolysiloxane, a dimethylpolysiloxane capped at both ends of the molecular chain with trimethylsilyl groups and having a viscosity of 10,000 mm²/s, 5 parts by weight of AEROSIL 300 (from Nippon Aerosil Co., Ltd.; BET specific surface area, 300 m²/g) as a fine silica powder, 0.3 part by weight of pendant trimethoxy-modified methylpolysiloxane of the formula

[Chemical Formula 21]

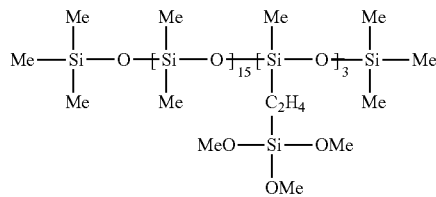

as a silica surface treatment agent, and 0.3 part by weight of water. The temperature was then raised to 150° C. and kneading was continued for 2 hours. The system was cooled to not more than 100° C., following which 3 parts by weight of potassium siliconate containing 3 wt % of potassium hydroxide was added as an alkaline catalyst and the mixture was kneaded for 0.1 hour at not more than 100° C. Next, the kneaded material was raised to a temperature of 150° C. and kneaded for 2 hours at 150° C. The material was cooled to not more than 100° C., then neutralized by adding 0.15 part by weight of succinic acid and kneading for 3 hours, giving Silicone Oil Compound (e-1).

Self-Emulsifying Defoamer Composition (M) was prepared by mixing the following at room temperature into 30 parts by weight of this Silicone Oil Compound (e-1): 70 parts by weight of Polyoxyalkylene-Modified Methylpolysiloxane (e-2) having an average composition expressed by the formula

[Chemical Formula 22]

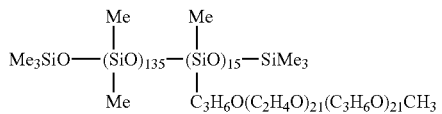

and a viscosity of 2,500 mm²/s.

Example 12

Emulsion-Type Defoamer Composition (N) was prepared by heating and dissolving a mixture of 20 parts by weight of Silicone Oil Compound (e-1) from Example 11, 4 parts by weight of sorbitan monostearate and 6 parts by weight of polyoxyethylene (55) monostearate, subsequently adding 70 parts by weight of water, and stirring and emulsifying with a homogenizing mixer.

Defoamer Compositions (I) to (N) obtained in Examples 7 to 12 were evaluated by the methods described above. The results are shown in Table 2. For the sake of reference, the results for Comparative Examples 1 and 2 also are presented in Table 2.

TABLE 2

| | Defoamer composition | Immediately | | After 30 minutes | | After 120 minutes | |
|---|---|---|---|---|---|---|---|
| | | Volume after shaking (mL) | Time until knockdown (seconds) | Volume after shaking (mL) | Time until knockdown (seconds) | Volume after shaking (mL) | Time until knockdown (seconds) |
| Working Example 7 | (I) | 65 | 4 | 65 | 5.5 | 70 | 14.5 |
| Working Example 8 | (J) | 60 | 3 | 60 | 5 | 65 | 11 |
| Working Example 9 | (K) | 60 | 4 | 65 | 5 | 70 | 16 |
| Working Example 10 | (L) | 60 | 3 | 60 | 4 | 65 | 12 |
| Working Example 11 | (M) | 65 | 3 | 65 | 11 | 70 | 22 |
| Working Example 12 | (N) | 60 | 2 | 60 | 9.5 | 65 | 18.5 |
| Comparative Example 1 | (G) | 65 | 4 | 80 | 45 | 85 | 65 |
| Comparative Example 2 | (H) | 60 | 4 | 70 | 25 | 75 | 45 |

The invention claimed is:

1. A method for producing an oil compound for a defoamer, the method comprising:
   (1) a first step of kneading together
      (A) 100 parts by weight of an inherently hydrophobic organopolysiloxane having a viscosity at 25° C. of from 10 to 100,000 mm²/s,
      (B) from 1 to 30 parts by weight of a fine silica powder having a specific surface area of at least 50 m²/g,
      (C) from 0.001 to 5 parts by weight of an organopolysiloxane of general formula (I) and/or (II) below

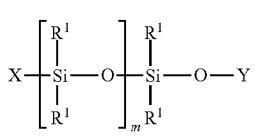           (I)

wherein X is an organic group selected from $R^1$ and Y—O—; Y is an organic group represented by —$SiR^1_{3-a}(OR^2)_a$; $R^1$ is a monovalent organic group of 1 to 20 carbon atoms; each $R^2$, which may be the same or different, is a hydrogen atom or a substituted or unsubstituted, saturated or unsaturated monovalent hydrogen carbon group of 1 to 20 carbon atoms; a is an integer from 1 to 3; and m is an integer of 2 or more

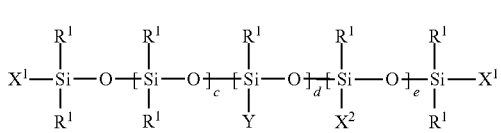           (II)

wherein each $R^1$ is independently a monovalent organic group of 1 to 20 carbon atoms, $X^1$ and $X^2$ are each independently $R^1$ or a group of formula (i) below

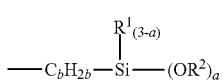           (i)

wherein $R^1$ is as defined above; each $R^2$, which may be the same or different, is a hydrogen atom or an unsubstituted or substituted, saturated or unsaturated monovalent hydrocarbon group of 1 to 20 carbon atoms; a is an integer from 1 to 3; and b is an integer of 2 or more, each Y is independently a group of formula (ii) below

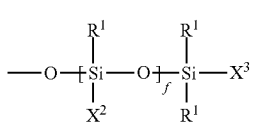           (ii)

wherein $R^1$ and $X^2$ are as defined above, $X^3$ is the same as $X^1$, and f is an integer of 0 or more, and c, d and e are each integers of 0 or more, with the proviso that at least on of $X^1$ to $X^3$ is a group of formula (i), and
      (D) from 0 to 5 parts by weight of water;
   (2) a second step of heat-treating the kneaded mixture obtained in the first step, the first and second steps together constituting a first compounding;
   (3) a third step of kneading (E) from 0.001 to 5 parts by weight of an alkaline catalyst or an acid catalyst into the kneaded mixture obtained in the second step;
   (4) a fourth step of heat-treating the kneaded mixture obtained in the third step, the third and fourth steps together constituting a second compounding; and
   (5) a fifth step of kneading an acid or an alkali as neutralizing agent into the kneaded mixture obtained in the fourth step.

2. The method for producing an oil compound for a defoamer according to claim 1,
   wherein the inherently hydrophobic organopolysiloxane is a linear or branched organopolysiloxane having a following average compositional formula (II)

           (II)

wherein each $R^3$ is an unsubstituted or substituted monovalent hydrocarbon group of 1 to 18 carbon atoms, which groups may be the same or different, g is a positive number such that $1.9 \leq g \leq 2.2$.

3. The method for producing an oil compound for a defoamer according to claim 1,
   wherein component (C) comprises the organopolysiloxane of general formula (I) which is an organopolysiloxane having dialkoxy or trialkoxy group at one or both ends.

4. The method for producing an oil compound for a defoamer according to claim 1,
   wherein component (C) comprises the organopolysiloxane of general formula (II) which has from 1 to 150 organoxy groups $OR^2$ or hydroxyl groups per molecule.

5. The method for producing an oil compound for a defoamer according to claim 1,
   wherein component (C) comprises the organopolysiloxane of general formula (II) which is an organopolysiloxane that is dialkoxy or trialkoxy-modified at both ends, on side chains, or at both ends and on side chains.

6. The method for producing an oil compound for a defoamer according to claim 1, wherein component (C) comprises at least the organopolysiloxane of general formula (I).

7. The method for producing an oil compound for a defoamer according to claim 1, wherein component (C) comprises at least the organopolysiloxane of general formula (II).

8. The method for producing an oil compound for a deformer according to claim 1, wherein
   the first step is carried out at a temperature of not more than 100° C. for a treatment time of 0.1 to 3 hours,
   the second step is carried out at a temperature of from 120 to 200° C. for a treatment time of 0.1 to 4 hours,
   he third step is carried out at a temperature of not more than 100° C. for a treatment time of 0.05 to 3 hours,
   the fourth step is carried out at a temperature of from 120 to 200° C. for a treatment time of 0.1 to 6 hours, and
   the fifth step is carried out at a temperature of not more than 100° C. for a treatment time of 0.1 to 4 hours.

* * * * *